US012277844B2

(12) United States Patent
Pryce-Hall

(10) Patent No.: US 12,277,844 B2
(45) Date of Patent: Apr. 15, 2025

(54) SECURITY TAG

(71) Applicant: SEKURA GLOBAL IP LLP, Colchester (GB)

(72) Inventor: Timothy Pryce-Hall, Colchester (GB)

(73) Assignee: Sekura Global IP LLP, Colchester (GB)

( * ) Notice: Subject to any disclaimer, the term of this patent is extended or adjusted under 35 U.S.C. 154(b) by 69 days.

(21) Appl. No.: 18/546,591

(22) PCT Filed: Feb. 17, 2022

(86) PCT No.: PCT/GB2022/050437
§ 371 (c)(1),
(2) Date: Aug. 15, 2023

(87) PCT Pub. No.: WO2022/175669
PCT Pub. Date: Aug. 25, 2022

(65) Prior Publication Data

US 2024/0135794 A1 Apr. 25, 2024
US 2024/0233503 A9 Jul. 11, 2024

(30) Foreign Application Priority Data

Feb. 18, 2021 (GB) ...................................... 2102311

(51) Int. Cl.
*G08B 13/24* (2006.01)
*E05B 73/00* (2006.01)

(52) U.S. Cl.
CPC ...... *G08B 13/2434* (2013.01); *E05B 73/0017* (2013.01)

(58) Field of Classification Search
CPC ........................ G08B 13/2434; E05B 73/0017
See application file for complete search history.

(56) References Cited

U.S. PATENT DOCUMENTS 3,932,918 A * 1/1976 Paskert ............... E05B 73/0017 24/537
4,104,622 A * 8/1978 Van Niel ............. E05B 73/0017 70/57.1

(Continued)

FOREIGN PATENT DOCUMENTS

WO 96/23123 8/1996
WO 2020/165038 8/2020
WO WO-2024042478 A1 * 2/2024

OTHER PUBLICATIONS

International Search Report and Written Opinion of the International Searching Authority from a corresponding International patent application (PCT/GB2022/050437) bearing a mailing date of Jun. 10, 2022.

(Continued)

*Primary Examiner* — Hoi C Lau
(74) *Attorney, Agent, or Firm* — Brown & Brown IP Law PLLC

(57) ABSTRACT

A security tag comprises a first arm including a first clamping surface and a pin housing proximate a distal end of the first arm; a second arm including a second clamping surface and a clutch mechanism proximate a distal end of the second arm; a hinge connecting proximal ends of the first and second arms; and a curved pin having a tip. The security tag is moveable between an open configuration, in which the arms are in an open position with respect to each other such that there is a first gap between the first and second clamping surfaces and the curved pin is in a disengaged position and at least partially housed within the pin housing, and a locked configuration, in which the arms are in a closed position with respect to each other such that there is a second smaller gap between the first and second clamping surfaces and the curved pin is engaged with the clutch mechanism to retain the arms in the closed position.

20 Claims, 3 Drawing Sheets

(56) References Cited

U.S. PATENT DOCUMENTS

| | | | | |
|---|---|---|---|---|
| 5,738,265 | A * | 4/1998 | Hirai | B65C 7/005 227/18 |
| 6,602,035 | B1 * | 8/2003 | Parker | E03C 1/33 411/433 |
| 8,695,244 | B2 * | 4/2014 | Eadie | A01K 11/002 40/302 |
| 9,637,951 | B2 * | 5/2017 | Luo | E05B 73/0017 |
| 2003/0000119 | A1 * | 1/2003 | Savy | A01K 11/001 40/301 |
| 2004/0032329 | A1 * | 2/2004 | DeConinck | G08B 13/1472 340/568.4 |
| 2005/0270155 | A1 * | 12/2005 | Sayegh | E05B 73/0017 340/568.1 |
| 2010/0058629 | A1 * | 3/2010 | Albee | A01K 11/001 235/494 |
| 2013/0036780 | A1 * | 2/2013 | Valade, Jr. | E05B 73/0052 70/276 |
| 2013/0340489 | A1 * | 12/2013 | Kozlowski, Jr. | E05B 73/0017 70/57.1 |
| 2016/0140820 | A1 * | 5/2016 | Joseph | G08B 13/2462 340/572.1 |
| 2016/0258192 | A1 * | 9/2016 | Bouan | E05B 39/002 |
| 2023/0243190 | A1 * | 8/2023 | Müller | E05B 73/0047 340/568.1 |
| 2024/0135794 | A1 * | 4/2024 | Pryce-Hall | G08B 13/2434 |
| 2024/0233503 | A9 * | 7/2024 | Pryce-Hall | E05B 73/0017 |

OTHER PUBLICATIONS

UKIPO Search Report from a corresponding GB patent application (GB 2102311.4) bearing a mailing date of Aug. 13, 2021.

* cited by examiner

SECURITY TAG

FIELD OF THE INVENTION

This invention relates to security tags, and in particular to security tags for use in a retail environment. The security tags of the present invention may be considered to be hard tags, and include a pin for attaching the tag to an item.

BACKGROUND TO THE INVENTION

In a retail environment it is known to affix security tags to products or articles within a store to deter or prevent theft of these articles. Typically these tags include an electronic article surveillance (EAS) sensor. While the EAS sensor is activated, the tag is arranged to trigger an alarm if the tag, and therefore the article, passes between a pair of detection gates, which are typically positioned at the entrance and exit of the retail store.

One type of EAS tag is commonly referred to as a hard tag and includes an acousto-magnetic sensor in a hard, or semi-rigid, plastic body. Such hard tags are typically physically or mechanically attached to an article by means of a pin, cable or lanyard.

When the article is purchased, the tag is detached from the article by a detacher located at the point of sale so that the alarm is not triggered when that person leaves the retail store. Hard tags that are deactivated and removed completely from the article are re-usable.

A further type of EAS tag is an acousto-magnetic (AM) label that includes a ferromagnetic or ferrimagnetic amorphous metal strip, which has magnetostrictive properties. Typically this amorphous metal strip will be a ferrite. The detection gates at the entrance and exit of the retail store emit periodic tonal bursts at around 58 kHz. This is the same as the resonant frequency of the amorphous metal strip or ferrite, which causes the amorphous strip to vibrate which leads to a change in its magnetisation. This change in magnetisation induces an AC voltage in a receiver antenna of the detection gate, which triggers an alarm. When a customer purchases an article having one of these AM labels attached to it, the label is deactivated by changing the magnetisation of part of the label so that the alarm is not triggered when that person leaves the retail store. The label, however, remains attached to the article and is, therefore, single use or disposable.

Traditionally, hard tags are applied to higher cost items and larger articles, while AM labels are typically attached to smaller, lower cost items.

Hard security tags are typically attached to articles such as clothing by means of a pin that pierces a part of the fabric of the clothing. When the tag is attached to the item of clothing the head of the pin sits on one side of the fabric and the tip of the pin is retained within a part of the hard tag on the other side of the fabric. A latch or clutch mechanism within the hard tag grips the tip of the pin so that the tag cannot be removed from the clothing without releasing the clutch mechanism. When the clutch mechanism is released, the tip of the pin can then be withdrawn from the hard tag and the pin can be removed from the clothing.

In order to pierce the fabric of the clothing, the tip of the pin is sharp, and when the tag is removed from the clothing, the pin presents a safety hazard. In some traditional systems, the sharp pin is entirely separate from the part of the hard tag including the clutch mechanism when the pin is not engaged with the clutch mechanism. In these systems there is, therefore, a high risk of injury from the exposed tip of the pin. In other systems the pin and the clutch mechanism are provided by a single security tag assembly. For example, the head of the pin may be attached to a first arm of the tag assembly and the clutch mechanism may be attached to a second arm of the tag assembly. In use, a piece of fabric is inserted into a gap between the two arms and the pin is moved to cross the gap, pierce the fabric and engage with the clutch mechanism. The pin may be movable relative to two static arms, or alternately the arms may be movable with respect to each other. For example, the arms may be hingedly or slidingly connected to each other.

One problem with known security tags including a pin, is that it may be difficult to correctly align the tip of the pin with an entrance to the clutch mechanism. This may make attaching the security tag to an item difficult. In particular, in may mean that a user has to make more than one attempt to engage the pin in the clutch mechanism. This makes damage or tearing of the fabric more likely, especially when the pin is being attached to a piece of delicate fabric.

Against this background it is desirable to provide a security tag that may be more reliably attached to an article and which is easier to use. An object of the present invention is therefore to provide an improved security tag that overcomes some of the problems with current hard pin tags.

SUMMARY OF THE INVENTION

An aspect of the invention provides a security tag comprising:

a first arm extending between a proximal end and a distal end, the first arm including a first clamping surface and a pin housing proximate the distal end of the first arm;

a second arm extending between a proximal end and a distal end, the second arm including a second clamping surface and a clutch mechanism proximate the distal end of the second arm;

a hinge connecting the first and second arms at their proximal ends; and a curved pin having a tip, the curved pin being associated with the pin housing, wherein, security tag is moveable between an open configuration, in which the first and second arms are in an open position with respect to each other such that there is a first gap between the first and second clamping surfaces and the curved pin is in a disengaged position in which the pin is at least partially housed within the pin housing, and a locked configuration, in which the first and second arms are in a closed position with respect to each other such that there is a second smaller gap between the first and second clamping surfaces and the curved pin is engaged with the clutch mechanism to retain the first and second arms in the closed position.

In use, with the security tag in the open configuration, a part of a pierceable article, such as a piece of fabric, is inserted into the first gap between the first and second clamping surfaces. The security tag is then moved into the locked configuration. During movement of the security tag from the open configuration to the locked configuration the curved pin pierces the article within the gap between the first and second clamping surfaces and engages with the clutch mechanism. This retains the security tag in the locked configuration and attaches the security tag to the pierceable article.

It will be appreciated that, as the first and second arms are hingedly connected at their proximal ends, the distal ends of the first and second arms follow a generally arcuate path as they move between the open and closed positions. The pin of the security tag is therefore advantageously curved so that the pin is able to more reliably engage with the clutch mechanism during this movement.

In preferred embodiments the curved pin is arcuate. The centre of radius of curvature of the curved pin is preferably coincident with the rotational axis of the hinge.

In the open configuration the curved pin is preferably fully housed within the pin housing.

In some embodiments the first and second arms are elongate. This may permit the security tag to pierce the pierceable article further from an edge of the article. It will be appreciated however that it may be advantageous for the first and second arms to not be elongate so as to reduce or minimise the overall size of the tag.

In preferred embodiments the hinge is a living hinge. The living hinge may comprise a flexible portion of the security tag between the proximal end of the first arm and the proximal end of the second arm. In other embodiments the hinge may comprise a hinge pin.

The first clamping surface may comprise a part of a surface of the first arm proximate or at the distal end of the first arm. The first clamping surface preferably includes an aperture through which the curved pin extends. The second clamping surface may comprise a part of a surface of the second arm proximate or at the distal end of the second arm. The second clamping surface may include an aperture through which the curved pin extends when the pin is engaged with the clutch mechanism.

The clutch mechanism preferably comprises an insertion pathway along which the curved pin enters the clutch mechanism. An axis of the insertion pathway is preferably at an angle of less than 90° to a plane of the second clamping surface. More preferably the angle between the axis of the insertion pathway and the plane of the second clamping surface is between 45° and 89°. The aperture in the second clamping surface may be disposed at one end of the insertion pathway.

The pin housing preferably comprises a side wall extending between a first end and a second end and surrounding an interior space of the housing. In preferred embodiments a centre line of the housing, extending between the first and second ends, is curved. A centre of a radius of curvature of the centre line preferably lies between the pin housing and the proximal end of the first arm. The centre of the radius of curvature may be coincident with the rotational axis of the hinge. Preferably the centre line is arcuate.

In preferred embodiments the security tag further comprises a button slidably received in the pin housing and connected to a head of the curved pin. In the locked configuration the button is preferably fully housed within the pin housing. The button may comprise an outwardly extending flange at an end of the button.

Movement of the first and second arms between the open and closed positions is preferably independent of the movement of the curved pin between the disengaged position and an engaged position in which the pin is engaged with the clutch mechanism. Accordingly, in some preferred embodiments the security tag further comprises a latched configuration in which the curved pin is in its engaged position and the first and second arms are in their open position. In the latched configuration the button is preferably fully housed within the pin housing.

This independent movement and distinct latched and locked configurations permits a user to firstly pierce the pierceable article with the pin, and then secondly to clamp the article between the first and second clamping surfaces. Clamping the article in this way minimises the risks of tearing or otherwise damaging the article if the tag is pulled while it is attached to the article. To allow the security tag to clamp pierceable articles such as thin fabrics, the range of movement of the first and second arms is preferably such that in the locked configuration at least a part of the first clamping surface may be in contact with a part of the second clamping surface.

In preferred embodiments the clutch mechanism comprises a gripping mechanism configured to grip a part of the curved pin proximate the tip, and a release mechanism arranged to release the gripping mechanism from the pin upon application of a magnetic field to the second arm.

The security tag may be an electronic article surveillance (EAS) tag, and therefore preferably further comprises an EAS sensor. The EAS sensor may be disposed in one of the first and second arms.

BRIEF DESCRIPTION OF THE DRAWINGS

The invention will now be further described by way of example only and with reference to the accompanying drawings, in which like reference signs are used for like features, and in which.

DESCRIPTION OF THE PREFERRED EMBODIMENTS

Figure 1:
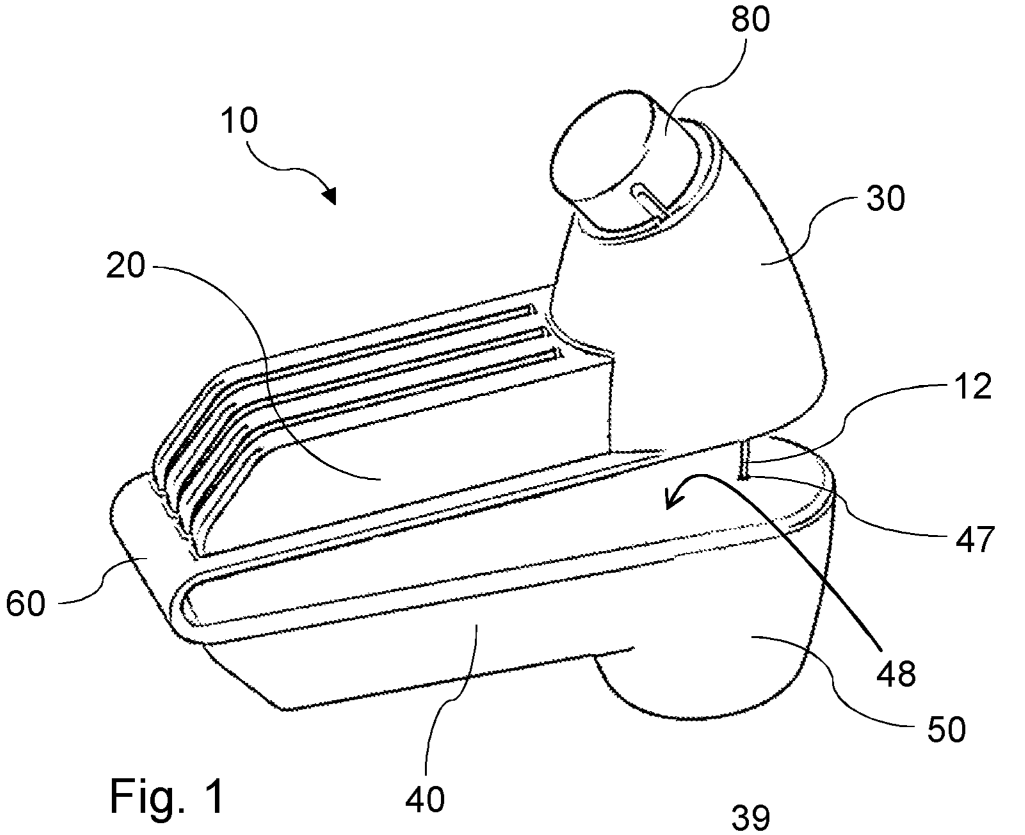
FIG. 1 is a perspective view of a security tag according to a preferred embodiment of the present invention.

A security tag 10 of the present invention is in the form of a hard tag including a pin 12. The security tag 10 is designed to be releasably attached to an article in a retail store. In particular the security tag 10 is designed to be attached to a pierceable article by piercing a part of the article with the pin 12. The pierceable article may be in the form of a garment or an item of clothing, bedding or other soft furnishings, or other merchandise such as luggage, fashion accessories, and footwear.

The security tag 10 preferably includes an electronic article surveillance (EAS) sensor (not shown) that generates detectable signals. A suitable EAS detector (not shown) is typically located at the entrance and/or exit of the retail store. If an article to which the security tag 10 is attached is removed from the store and, therefore, passes the detector, the detector detects signals emitted by the EAS sensor and triggers an alarm. To allow the article to leave the store without triggering the alarm, for example after purchase of the article, the security tag 10 is detached from the article. Typically the tag 10 is detached at the point of sale of the article by a suitable detacher system (not shown).

The tag 10 comprises a first portion or arm 20 that extends between a first, distal end 22 and a second, proximal end 24, and a second portion or arm 40 that extends between a first, distal end 42 and a second, proximal end 44. The arms 20, 40 are connected at their respective proximal ends 24, 44 by a hinge 60. In this example the hinge 60 is in the form of a living hinge or flexible portion between the first and second arms 20, 40. The hinge 60 permits the first and second arms 20, 40 to move relative to each other between an open position, shown in FIG. 2, and a closed position, shown in FIG. 4. In particular, each of the first and second arms 20, 40 rotates about an axis of rotation of the hinge 60. As such, each of the distal ends 22, 42 travels along an arcuate or curved path between the open and closed positions. The hinge 60 is preferably arranged to bias the arms 20, 40 into the open position.

The first arm 20 of the tag 10 comprises an elongate member 26 having a first clamping surface 28. Similarly, the second arm 40 comprises an elongate member 46 having a second clamping surface 48. The first and second clamping surfaces 28, 48 oppose each other across a gap or slot 70 of the security tag 10 defined between the first arm 20 and the second arm 40. In the open position there is a first distance between the clamping surfaces 28, 48, and in the closed position there is a second distance between the clamping surfaces 28, 48, the second distance being smaller than the first distance. The second distance may be zero, such that the clamping surfaces 28, 48 are in contact with each other in the closed position.

The slot 70 extends from the distal ends 22, 42 of the arms 20, 40 in a direction towards the hinge 60 at the proximal ends 24, 44 of the arms 20, 40. The slot 70 is configured to receive a part of a pierceable article, such as an item of clothing or other textile article, such that part of the article is disposed between the clamping surfaces 28, 48 of the first and second arms 20, 40. The pierceable article may be disposed between the clamping surfaces 28, 48 at the distal ends 22, 42 of the arms 20, 40.

A pin housing 30 is disposed at the distal end 22 of the elongate member 26. The pin housing 30 comprises a side wall 32 extending from the elongate member 26. The side wall 32 surrounds and defines an interior space 34 of the pin housing 30. The side wall 32 extends between a first end 36, where the side wall 32 is connected to the elongate member 26, and a second end 38, furthest from the elongate member 26. The second end 38 of the side wall 32 surrounds an opening 39 of the housing 30.

Figure 2:
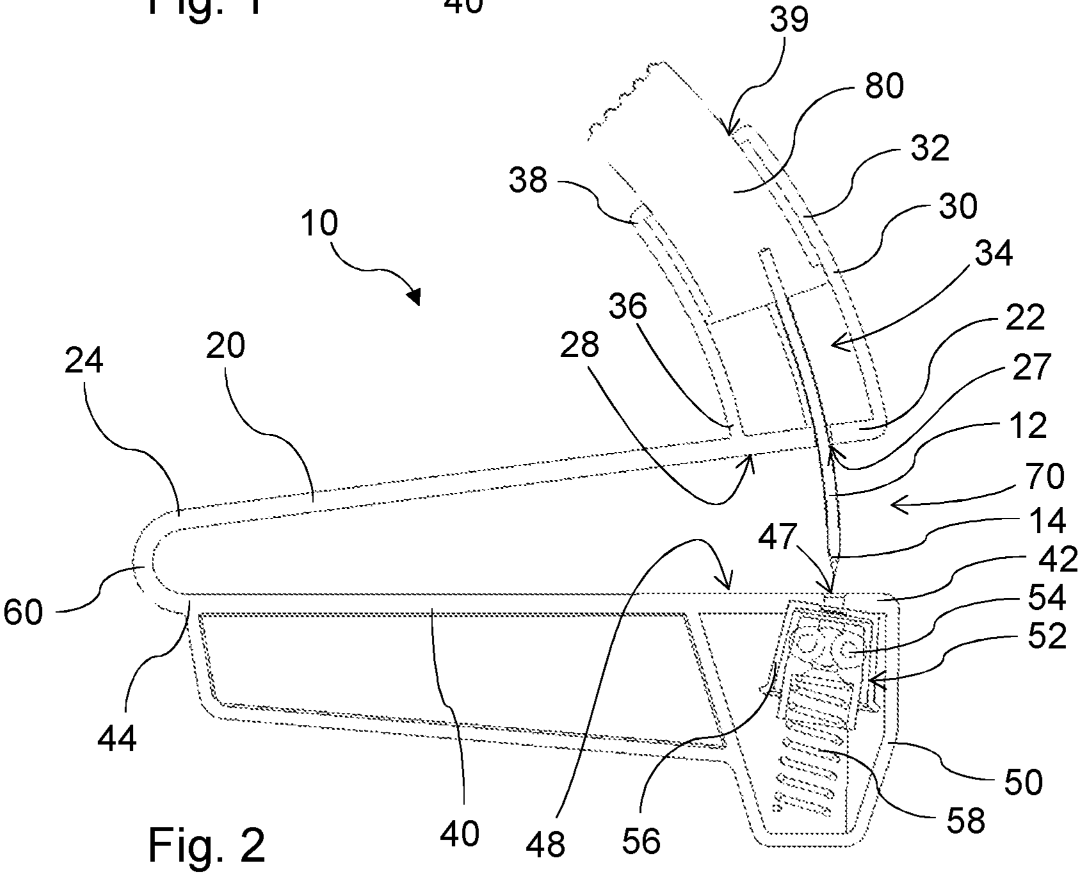
FIG. 2 is a cross-sectional view of the security tag of FIG. 1 in a disengaged configuration.

As shown most clearly in FIG. 2, a centre line of the housing 30, extending between the first and second ends 36, 38, is curved. In particular the centre line is curved such that a centre of a radius of curvature of the centre line preferably lies between the pin housing 30 and the second end 24 of the first arm 20. The centre of the radius of curvature of the centre line may be coincident with the axis of rotation of the hinge 60. The centre line may be continuously curved or may include at least one curved section. In some preferred embodiments the centre line is arcuate, having a constant radius of curvature.

A button 80 is disposed in the pin housing 30. The button 80 extends between first and second ends 82, 84. A length of the button 80, between the first and second ends 82, 84, is shorter than a length of the pin housing 30 between its first and second ends 36, 38. Furthermore, because in this example the pin housing 30 has a curved centre line, the button 80 has a corresponding shape so as to be engageable with the housing 30. In particular, in the same manner as the pin housing 30, a centre line of the button 80, extending between the first and second ends 82, 84, is curved. In particular the centre line is curved such that a centre of a radius of curvature of the centre line preferably lies between the pin housing 30 and the second end 24 of the first arm 20 with the button 80 disposed in the pin housing 30. The centre of the radius of curvature of the centre line may be coincident with the axis of rotation of the hinge 60. The centre line may be continuously curved or may include at least one curved section. In some preferred embodiments the centre line is arcuate, having a constant radius of curvature.

The button 80 is slidably engaged with the side wall 32 of the pin housing 30. The button 80 is moveable between an extended position, shown in FIG. 2, to an inserted position, shown in FIGS. 3 and 4. In the extended position the button 80 protrudes from the opening 39 of the pin housing 30. In the extended position the first end 82 of the button 80 is disposed within the pin housing 30 and the second end 84 of the button 80 is disposed beyond the second end 38 of the side wall 32 of the housing 30. In the extended position the first end 82 of the button 80 may be disposed at or proximate the second end 38 of the side wall 32. In the inserted position both the first end 82 and the second end 84 of the button 80 are disposed within the housing 30. In the inserted position the first end 82 of the button 80 may be disposed at or proximate the first end 36 of the side wall 32. The button 80 is preferably biased into the extended position.

The pin 12 is connected to the button 80. In particular the pin 12 extends from the first end 82 of the button 80. The pin 12 extends from the button 80 to a sharp tip 14 of the pin 12. The pin 12 is curved. The pin 12 may be continuously curved or may include at least one curved section. In some preferred embodiments the pin 12 is arcuate, having a constant radius of curvature. Preferably the pin 12 is connected or attached to the button 80 so that the centre line of the button 80 and the curved pin 12 lie on a continuous curved or arcuate path.

The pin 12 extends through an aperture 27 in the first arm 20. The aperture 27 is disposed in the elongate member 26 and is aligned with the interior space 34 of the pin housing 30. With the button 80 in the extended position the tip 14 of the pin 12 may be disposed within the pin housing 30. Alternatively, the pin 12 may only protrude a short distance through the aperture 27. Importantly, with the button 80 in the extended position the pin 12 is in a disengaged position in which the pin 12 does not span the gap or slot 70 between the first and second arms 20, 40. As such, with the pin 12 in the disengaged position a pierceable article may be inserted into the slot 70.

Figure 3:
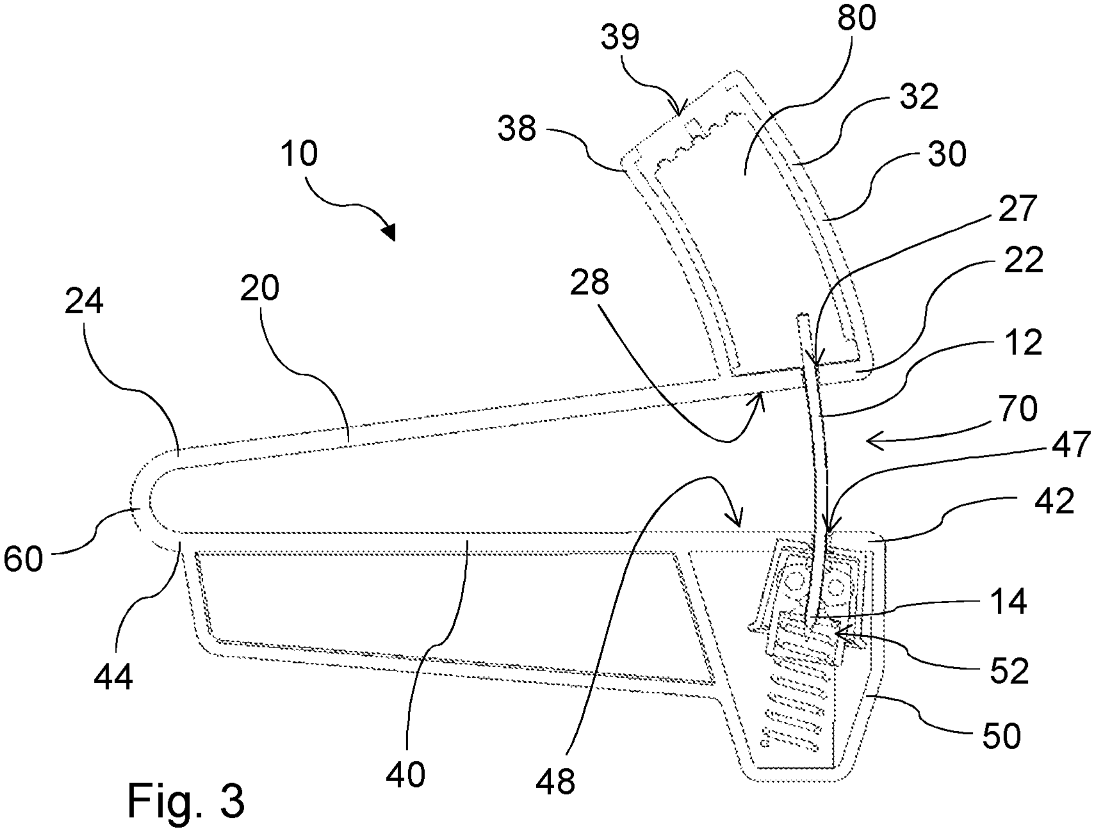
FIG. 3 is a cross-sectional view of the security tag of FIG. 1 in a latched configuration.

When the button 80 is pressed to move the button 80 from the extended position to the inserted position, the pin 12 moves to an engaged position, shown in FIG. 3. In this engaged position the pin 12 spans the slot 70. Movement of the pin 12 from the disengaged position to the engaged position therefore allows the tip 14 of the pin 12 to pierce an article disposed in the slot 70.

The second arm 40 of the security tag 10 includes a clutch housing 50. The clutch housing 50 is disposed at or proximate the distal end 42 of the second arm 40. A clutch mechanism 52 is disposed within the clutch housing 50. The clutch mechanism 52 is configured to releasably retain the tip 14 of the pin 12.

Suitable clutch mechanisms 52 are known in the art and will not be described in detail; however, one example of a clutch mechanism 52 shown in this example includes a plurality of ball bearings or spheres 54 retained in a volume defined by a tubular or conical retaining wall 56. The clutch mechanism 52 further comprises an annular metal press plate and biasing means in the form of a spring 58, the annular press plate being positioned between the ball bearings 54 and an end of the spring 58. When the pin 12 is inserted into the clutch mechanism 52, the tip 14 of the pin 12 extends between the ball bearings 54 so that the ball bearings 54 surround the pin 12. The clutch mechanism 52 is biased into a first, gripping position, in which the ball bearings 54 are urged towards the pin 12, by the spring 58.

A shaft of the pin 12 proximate the tip 14 may include one or more circumferential or annular grooves in which the ball bearings 54 are at least partially seated when the clutch mechanism 52 is in the gripping position.

When the pin 12 is moved into the engaged position the tip 14 of the pin 12 enters the clutch housing 50 through an aperture 47 in the second arm 40. The aperture 47 is disposed in the elongate member 46 and is aligned with the clutch mechanism 52 within the clutch housing 50. The tip 14 of the pin 12 then engages with the clutch mechanism 52 as described above. The action of the clutch mechanism 52 is such that, while the pin 12 can be inserted further into the clutch mechanism 52 in a first insertion direction, the gripping of the pin 12 prevents the pin 12 from being withdrawn from the clutch mechanism 52 in a second withdrawing direction. Accordingly, the clutch mechanism 52 retains the pin 12 in its engaged position.

The position of the aperture 47 is such that it lies on the curved path along which the tip 14 of the curved pin 12 moves as the pin 12 moves from the disengaged to the engaged position. Accordingly, the tip 14 of the pin 12 is reliably inserted through the aperture 47 each time the security tag 10 is used. Additionally, the clutch mechanism 52 is preferably angled with respect to a plane of the clamping surface 48 such that the curved pin 12 is reliably engaged with the clutch mechanism 52.

In this example, an axis of the clutch mechanism 52 is at an angle of less than 90° to the plane of the clamping surface 48, and most preferably at an angle of between 45° and 89° to the clamping surface 48. The axis of the clutch mechanism 52 is equivalent or corresponds to an insertion pathway of the clutch mechanism 52 along which a pin travels as it is inserted into the clutch mechanism. In this example the axis of the clutch mechanism 52 is coaxial with both an axis of the spring 58 and an axis of the annular/tubular/conical retaining wall 56.

In this example, the clutch mechanism 52 is substantially identical to a prior art clutch mechanism previously configured to retain a straight pin. When the curved pin 12 of the present security tag 10 is inserted into the clutch mechanism 52, the angle of the clutch mechanism 52 accommodates some of the curvature of the pin 12. In other words, the linear axis of the clutch mechanism 52 effectively lies on a tangent to the curved pathway along which the tip 14 of the pin 12 travels between the disengaged and engaged positions.

With the pin 12 in its engaged position spanning the slot 70 and engaged with the clutch mechanism 52, and with the arms 20, 40 in the open position, the security tag 10 is in a latched configuration, as shown in FIG. 3.

To minimise the possibility of damage to the pierceable article, it is advantageous if the security tag 10 grips or clamps the article around the site of the piercing. This minimises the likelihood of the article, such as a piece of fabric, tearing if the security tag 10 is pulled.

To achieve this with the present security tag 10, a user may move the first and second arms 20, 40 of the tag 10 into their closed position so that the article is clamped between the opposed clamping surfaces 28, 48. Movement of the first and second arms 20, 40 into the closed position inserts the pin 12 further into the clutch mechanism 52 so that the pin 12 is gripped by the ball bearings 54 further from the tip 14 of the pin 12. The first and second arms 20, 40 are preferably moved until the clamping surfaces 28, 48 contact the pierceable article disposed in the slot 70. The clutch mechanism 52 then acts to retain the arms 20, 40 in the closed position.

Figure 4:
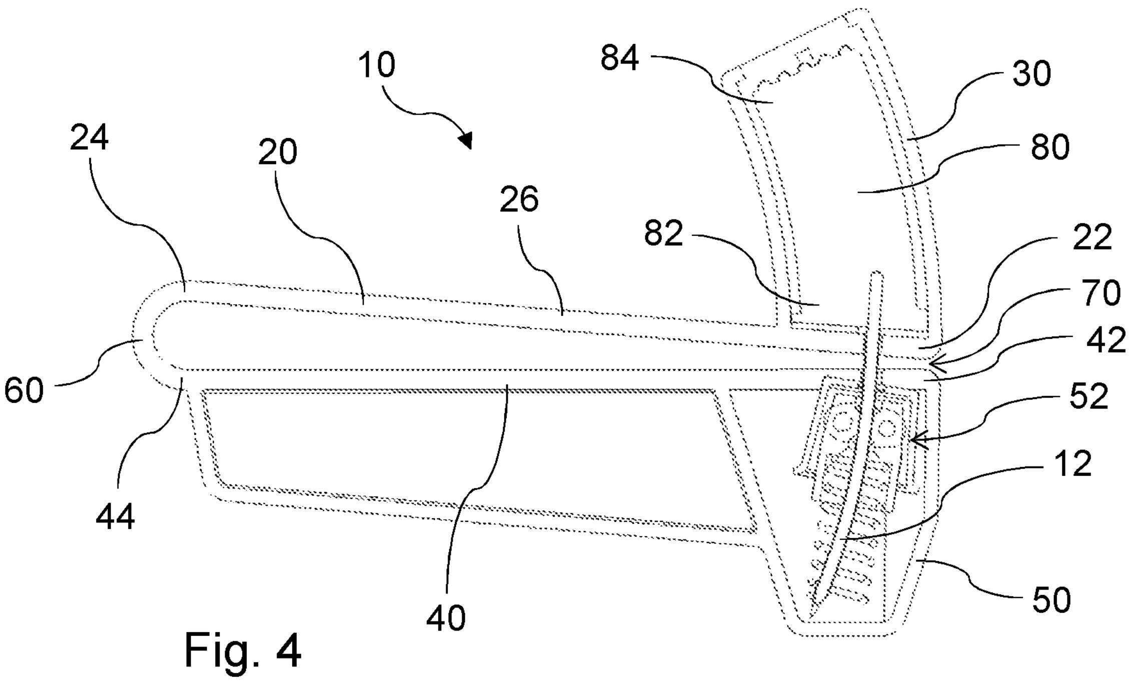
FIG. 4 is a cross-sectional view of the security tag of FIG. 1 in a closed configuration.

With the pin 12 in its engaged position spanning the slot 70 and engaged with the clutch mechanism 52, and with the arms 20, 40 in the closed position, the security tag 10 is in a locked configuration, as shown in FIG. 4.

It will, therefore, be appreciated that the movement of the pin 12 between the disengaged and engaged positions is at least partially independent of the movement of the first and second arms 20, 40 between the open and closed positions. This may allow a user to depress the button 80 to move the pin 12 to pierce an article before moving the arms 20, 40 to clamp the article. This may allow a user to see where the article is being pierced before then closing the arms 20, 40. Alternatively, a user may close the arms 20, 40 before depressing the button 80. This allows a user to clamp or grip the article before piercing it. This may have an advantage when an article is difficult to pierce as it allows a greater force to be applied to the pin 12, or if a piece of fabric is delicate and needs to be held securely before piercing. In practice it is likely that a user will move the first and second arms 20, 40 into the closed position and the pin into the engaged position simultaneously.

To release and remove the security tag 10 from the article, the clutch mechanism 52 must be released to remove the pin 12 from the clutch mechanism 52, return the pin 12 to its disengaged position and return the arms 20, 40 to their open position.

To release the clutch mechanism 52 a magnetic force is preferably applied to a part of the second arm 40 proximate the clutch housing 50. The magnetic force acts on a part of the clutch mechanism 52, in this example the press plate, to draw the press plate in a direction away from the narrow end of the conical volume, against the force of the spring 58. This reduces the gripping force of the ball bearings 54 on the pin 12, such that the pin 12 is released from the clutch mechanism 52.

The pin 12 is preferably automatically returned to its disengaged position by the biasing force applied to the button 80. As this biasing force moves the button 80 to the extended position, the pin 12 is drawn out of the clutch mechanism 52 and into its disengaged position. Similarly, once the pin 12 is released, the hinge 60 automatically returns the first and second arms 20, 40 to the open position.

Several variations and modifications to the above-described embodiment are possible.

The hinge 60 may not be in the form of a living hinge, but may instead include a hinge pin about which the first and second arms 20, 40 rotate. In these embodiments the security tag 10 may include a biasing member or biasing mechanism, such as a spring, that is arranged to bias the first and second arms 20, 40 into the open position.

In the above example the first and second arms 20, 40 were elongate. In other embodiments the arms 20, 40 may not be elongate. The arms 20, 40 may be of any suitable length. The provision of shorter arms 20, 40 may make the security tag 10 more compact. Alternatively, the inclusion of longer arms 20, 40 may allow an article to be pierced further from an edge of the article.

As described above the button 80 preferably comprises a single piece. This makes construction of a curved button 80 easier. In other embodiments, however, the button 80 may comprise a plurality of segments. These segments may be telescopically arranged such that the pin housing 30 may be more compact. In these tags 10, each of the plurality of segments may be curved.

It will be appreciated that other clutch mechanisms 52 for applying a releasable gripping force to the pin 12 are also well known and may alternatively be utilised in a security tag 10 according to the present invention. The clutch mechanism 52 and the pin 12 may be designed to provide a series of discrete positions in which the clutch mechanism 52 will retain the pin 12. Alternatively, the pin 12 may be retained by the clutch mechanism 52 in any position.

Figure 5:
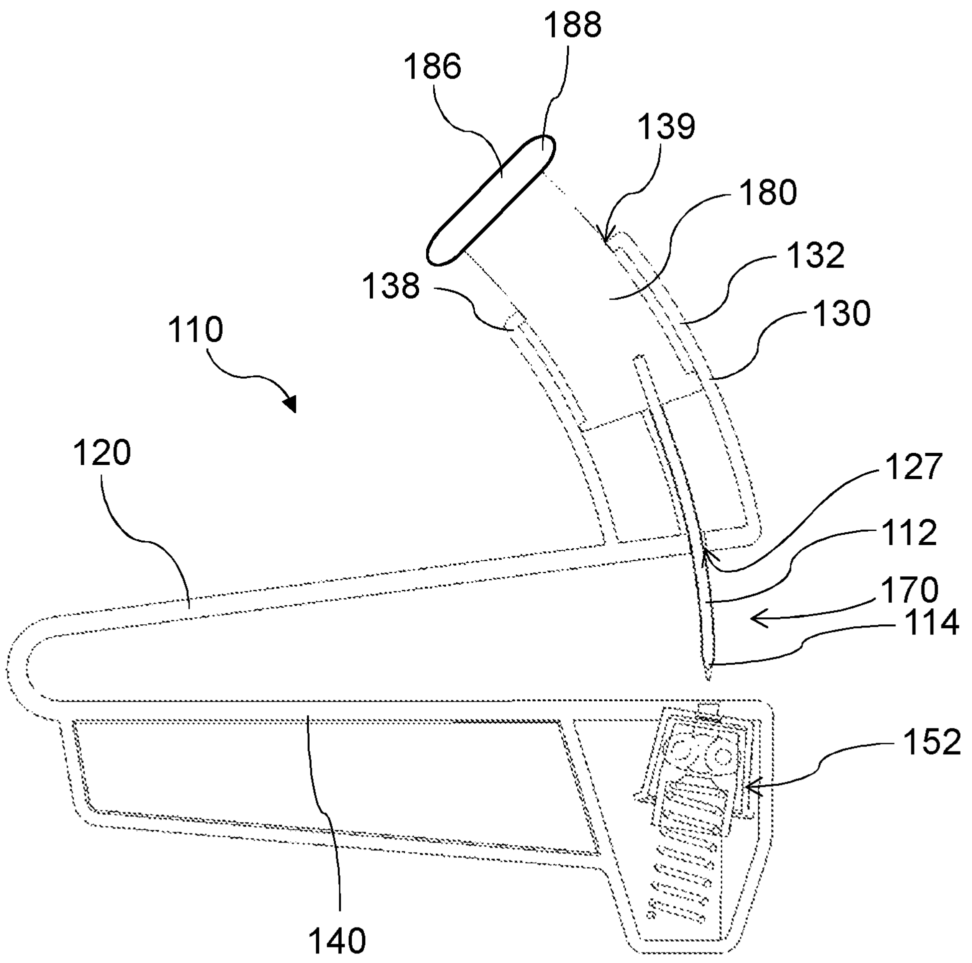
FIG. 5 is a cross-sectional view of a security tag according to a further preferred embodiment of the invention.

A further embodiment of a security tag 110 is illustrated in FIG. 5. Most of the features of this tag 110 are identical to the security tag 10 of the first embodiment and will not be described further in relation to this embodiment.

The security tag 110 comprises a button 180 including a cap portion 186 at a second end 184 of the actuating button 180. The cap portion 186 includes an outwardly extending flange or annular projection 188. The annular projection 188 extends outwardly from a circumferential or perimeter edge of the button 180 at the second end 184 of the button 180. The annular projection 188 or cap portion 186 provides a gripping member of the button 180. A diameter of an outer circumferential edge of the annular projection 188 is preferably greater than an outer diameter of the side wall 132 of the pin housing 130.

A curved pin 112 extends from the first end 182 of the button 180. The pin 112 is arranged to extend through an aperture 127 in the first arm 120 of the security tag 110.

The button 180 is moveable between an extended position and an inserted position. In the extended position the button 180 protrudes a first distance from an opening 139 of the pin housing 130. In the inserted position the button 180 protrudes a second distance from an opening 139 of the pin housing 130, the second distance being significantly smaller than the first distance. In a preferred embodiment, when the button 180 is in the inserted position the cap portion 186 is in contact with the second end 138 of the pin housing 130. The button 180 is preferably biased into the extended position.

With the button 180 in the extended position a tip 114 of the pin 112 may be disposed within the pin housing 130 or may protrude a short distance through the aperture 127. Importantly, with the button 180 in the extended position the pin 112 is in a disengaged position in which the pin 112 does not span the gap or slot 170 between the first and second arms 120, 140. As such, with the pin 112 in the disengaged position a pierceable article may be inserted into the slot 170.

When the button 180 is pressed to move the button 180 from the extended position to the inserted position, the pin 112 moves to an engaged position. In this engaged position the pin 112 spans the slot 170. Movement of the pin 112 from the disengaged position to the engaged position therefore allows the tip 114 of the pin 112 to pierce an article disposed in the slot 170. Furthermore, in the engaged position the pin 112 engages with a clutch mechanism 152 in the second arm 140, as described above in relation to the first embodiment.

As described above, to release and remove the security tag 110 from an article, the clutch mechanism 152 must be released to remove the pin 112 from the clutch mechanism 152 and return the pin 112 to its disengaged position. To release the clutch mechanism 152 a magnetic force is preferably applied to a part of the second arm 140. The pin 112 is then preferably automatically returned to its disengaged position by a biasing force applied to the button 180. As this biasing force moves the button 180 to the extended position, the pin 112 is drawn out of the clutch mechanism 152 and into its disengaged position.

In some circumstances the application of a suitable detacher to the clutch mechanism 152 may not result in the clutch mechanism 152 fully releasing the pin 112. In these circumstances the biasing force applied to the button 180 may not be sufficient to return the button 180 to its extended position and to withdraw the pin 112 from the article. In other circumstances the detacher may cause the clutch mechanism 152 to release, but the tip 114 of pin 112 may remain within the second arm 140 due to a gripping force applied to the pin 112 by the article or material through which the pin 112 has pierced. This may be the case, for example, if the material is thick and/or stiff, such as a leather or rubber material. In these circumstances, the gripping force applied by the material to the pin 112 may be greater than the biasing force applied to the button 180.

In these and similar circumstances, in which automatic retraction of the pin 112 is prevented after a suitable detacher has been applied to the clutch mechanism 152, a user may grip the cap portion 186 of the button 180 and manually pull the button 180 into the extended position to withdraw the pin 112 and return the pin 112 to its disengaged position.

The provision of the cap portion 186 is also beneficial in embodiments of the security tag 110 in which the pin 112 is not automatically returned to the disengaged position by a biasing member acting on the button 180. In these embodiments a user may grip the cap portion 186 of the button 180 to manually return the button 180 to the extended position.

Other modifications and variations not explicitly disclosed above may also be contemplated without departing from the scope of the invention as defined in the appended claims.

The present invention therefore provides a security tag that is easy to use and in which the pin is reliably engaged with a clutch mechanism. The curvature of the button and pin also means that the security tag is more ergonomic than previous security tags.

The invention claimed is:

1. A security tag comprising:

a first arm extending between a proximal end and a distal end, the first arm including a first clamping surface and a pin housing proximate the distal end of the first arm;

a second arm extending between a proximal end and a distal end, the second arm including a second clamping surface and a clutch mechanism proximate the distal end of the second arm;

a hinge connecting the first and second arms at their proximal ends; and a curved pin having a tip, the curved pin being associated with the pin housing, wherein, security tag is moveable between an open configuration, in which the first and second arms are in an open position with respect to each other such that there is a first gap between the first and second clamping surfaces and the curved pin is in a disengaged position in which the pin is at least partially housed within the pin housing, and a locked configuration, in which the first and second arms are in a closed position with respect to each other such that there is a second smaller gap between the first and second clamping surfaces and the curved pin is engaged with the clutch mechanism to retain the first and second arms in the closed position.

2. The security tag of claim 1, wherein the curved pin is arcuate.

3. The security tag of claim 1, wherein the first and second arms are elongate.

4. The security tag of claim 1, wherein the hinge is a living hinge.

5. The security tag of claim 1, wherein the first clamping surface includes an aperture through which the curved pin extends.

6. The security tag of claim 1, wherein the clutch mechanism comprises an insertion pathway along which the curved pin enters the clutch mechanism, and wherein an axis of the insertion pathway is at an angle of less than 90° to a plane of the second clamping surface.

7. The security tag of claim 6, wherein the angle between the axis of the insertion pathway and the plane of the second clamping surface is between 45° and 89°.

8. The security tag of claim 1, wherein the pin housing comprises a side wall extending between a first end and a second end and surrounding an interior space of the housing, and wherein a centre line of the housing, extending between the first and second ends, is curved.

9. The security tag of claim 8, wherein a centre of a radius of curvature of the centre line lies between the pin housing and the proximal end of the first arm.

10. The security tag of claim 8, wherein the centre line is arcuate.

11. The security tag of claim 1, further comprising a button slidably received in the pin housing and connected to a head of the curved pin.

12. The security tag of claim 11, wherein in the locked configuration the button is fully housed within the pin housing.

13. The security tag of claim 1, wherein movement of the first and second arms between the open and closed positions is independent of the movement of the curved pin between the disengaged position and an engaged position in which the pin is engaged with the clutch mechanism.

14. The security tag of claim 13, further comprising a latched configuration in which the curved pin is in its engaged position and the first and second arms are in their open position.

15. The security tag of claim 14, further comprising button slidably received in the pin housing and connected to a head of the curved pin, and wherein in the latched configuration the button is fully housed within the pin housing.

16. The security tag of claim 1, wherein in the locked configuration at least a part of the first clamping surface is in contact with a part of the second clamping surface.

17. The security tag of claim 1, wherein the clutch mechanism comprises:

a gripping mechanism configured to grip a part of the curved pin proximate the tip; and a release mechanism arranged to release the gripping mechanism from the pin upon application of a magnetic field to the second arm.

18. The security tag of claim 1, wherein the tag is an electronic article surveillance (EAS) tag, and further comprises an EAS sensor.

19. The security tag of claim 1, wherein in the open configuration the curved pin is fully housed within the pin housing.

20. The security tag of claim 1, further comprising a button slidably received in the pin housing and connected to a head of the curved pin, and wherein the button further comprises an outwardly extending flange at an end of the button.

* * * * *